United States Patent [19]

Windemuller et al.

[11] Patent Number: 5,259,177
[45] Date of Patent: Nov. 9, 1993

[54] BLUEBERRY PICKING MACHINE
[76] Inventors: Donald Windemuller, 15410 Greenly St., Holland, Mich. 49424; Wayne A. Vogel, 12191 Maple Island Rd., Fremont, Mich. 49412
[21] Appl. No.: 784,552
[22] Filed: Oct. 29, 1991

Related U.S. Application Data

[63] Continuation-in-part of Ser. No. 738,215, Jul. 30, 1991, Pat. No. 5,113,644.
[51] Int. Cl.⁵ .............................................. A01D 46/00
[52] U.S. Cl. .................................. 56/330; 56/12.8; 56/DIG. 8
[58] Field of Search ................... 56/330, 12.8, 14.3, 56/328.1, 340.1, 329, DIG. 2, DIG. 8

[56] References Cited

U.S. PATENT DOCUMENTS

| | | | |
|---|---|---|---|
| 2,660,021 | 11/1953 | McDowell | 56/330 |
| 3,184,908 | 5/1965 | Rust | 56/330 |
| 3,255,578 | 6/1966 | Pertics | 56/330 |
| 3,325,984 | 6/1967 | Christie et al. | 56/330 |
| 3,344,591 | 10/1967 | Christie et al. | 56/330 |
| 3,385,042 | 5/1968 | Christie et al. | 56/330 |
| 3,494,117 | 2/1970 | Weygandt et al. | 56/330 |
| 3,590,566 | 7/1971 | Cutts, Sr. | 56/330 |
| 3,601,964 | 8/1971 | Fisher | 56/330 |
| 3,720,050 | 3/1973 | Rozinska | 56/330 |
| 3,772,866 | 11/1973 | Sell | 56/330 |
| 3,827,222 | 8/1974 | Toti | 56/330 |
| 3,872,655 | 3/1975 | Davis, Sr. | 56/27.5 |
| 3,959,959 | 6/1976 | Louault et al. | 56/330 |
| 4,114,463 | 9/1978 | Garden et al. | 74/61 |
| 4,150,526 | 4/1979 | Burton | 56/329 |
| 4,173,859 | 11/1979 | Goldsmith et al. | 56/330 |
| 4,179,873 | 12/1979 | Scudder | 56/330 |
| 4,186,547 | 2/1980 | James | 56/330 |
| 4,241,569 | 12/1980 | Bobard et al. | 56/330 |
| 4,282,706 | 8/1981 | Orlando | 56/330 |
| 4,283,906 | 8/1981 | Scudder | 56/330 |
| 4,286,426 | 9/1981 | Orlando et al. | 56/330 |
| 4,292,792 | 10/1981 | Burton | 56/330 |
| 4,303,373 | 12/1981 | Polhemus | 415/206 |
| 4,418,521 | 12/1983 | Orlando et al. | 56/330 |
| 4,430,849 | 2/1984 | Wilson et al. | 56/12.8 |
| 4,750,322 | 6/1988 | Korthuis | 56/328.1 |
| 4,860,529 | 8/1989 | Peterson et al. | 56/330 |
| 4,959,950 | 10/1990 | Burke | 56/330 X |
| 4,972,662 | 11/1990 | Korthuis et al. | 56/10.2 |
| 4,974,404 | 12/1990 | Korthuis et al. | 56/330 |
| 4,982,558 | 1/1991 | Korthuis | 56/12.6 |
| 5,010,719 | 4/1991 | Korthuis | 56/10.2 |
| 5,027,593 | 7/1991 | Korthuis | 56/328.1 |
| 5,027,593 | 7/1991 | Korthuis et al. | 56/328.1 |

FOREIGN PATENT DOCUMENTS

| | | |
|---|---|---|
| 2421546 | 11/1979 | France. |
| 2452239 | 10/1980 | France. |
| 1227229 | 4/1986 | U.S.S.R. . |

Primary Examiner—Terry Lee Melius
Attorney, Agent, or Firm—Price, Heneveld, Cooper, DeWitt & Litton

[57] ABSTRACT

A straddle-type, self-propelled crop harvesting machine having an inverted U-shaped frame for passing over a row of crop bearing bushes. The frame has a longitudinal opening through which the row of crop bearing bushes pass and into which depend a pair of spaced, freely rotatable picking members. Each picking member is supported from a subframe which is pivotally attached to the main frame of the harvesting machine. Each subframe is supported on an air bag which can be used to set the initial height of the picking assembly and which also tends to isolate vibration from the main frame of the harvesting machine. A bearing assembly depends from the subframe and supports a housing in which two rotatable eccentric weights are mounted. The weights rotate in a vertical plane in phase but in opposite directions so that the weights pass at the top and bottom of each rotation and impart a vertical force to the housing. The weights are horizontally spaced from one another which imparts a horizontal twist to the housing as the weights extend outwardly in opposite directions. An elongated shaft depends from the housing and supports a plurality of spaced tiers of elongated fingers which can penetrate deeply into each bush. The sum of the vertical and horizontal forces imparted to each housing by the rotating eccentric weights is imparted to the depending shaft and picking fingers. The picking fingers undergo a complex motion which enables each picking finger to apply both a vertical and a horizontal force to each branch of a bush to gently harvest the crop.

16 Claims, 6 Drawing Sheets

BLUEBERRY PICKING MACHINE

CROSS-REFERENCE TO RELATED APPLICATION

The present invention relates to application Ser. No. 07/605,580 in the name of Donald Windcmuller which was filed on Oct. 30, 1990, now U.S. Pat. No. 5,074,107, issued Dec. 24, 1991 and is a continuation-in-part of application Ser. No. 07/738,215 in the name of Donald Windemuller and Wayne A. Vogel, filed Jul. 30, 1991 now U.S.. Pat. No. 5,113,644, issued May 19, 1992. The subject matter of both applications is incorporated herein by reference.

BACKGROUND OF THE INVENTION

The use of straddle-type blueberry picking machines is well known today. These machines employ a substantially U-shaped elevated ground contacting frame which is usually self-propelled. The fruit bearing bushes are usually planted in spaced rows. The machine then straddles each row with the blueberry bushes passing through a longitudinal opening in the center of the machine. In order to dislodge the ripened berries from the branches of the bush, arms have been used which project out from each side into the longitudinal opening to agitate the bushes as the machine moves along the row. Others have suggested the use of freely rotating spaced drums with fingers projecting from the outer surface which roll along the bush at the same speed as the harvesting machine passes over the ground. The drums are biased inwardly to force the drums into contact with the surface of the bushes. Fingers projecting from the drums comb the surface of the bushes and knock the ripened berries off the branches.

In this description, blueberries and blueberry bushes is used as a representative crop bearing bush. The invention, however, is not so limited. The term "blueberry" is used as a generic expression for all types of berries, fruits, beans, nuts, vegetables, and the like., which grow on bushes, trees and vines and which can be harvested mechanically by a machine passing over the crop bearing plant.

In order to improve the harvesting with straddle-type harvest machines employing freely rotating shakers or brush-like members, means have been used to cause the shakers to vibrate or twist as they roll along the bushes. For example, Rust U.S. Pat. No. 3,184,908 has a pair of laterally and longitudinally spaced, vertically oriented shakers fixed to a ground contacting frame. A pair of spaced crankshafts connected by an endless chain extend across the top of the frame. Each shaker is rotatably connected to 180° opposed cranks on the crankshafts. The crankshafts are driven by a power take off from a tractor which causes the shakers to move up and down as the shakers roll along in contact with the fruit bearing plants. When using this type of assembly, the drive mechanism for the shakers can be loaded down when the rods or fingers on each shaker enter into a bush with heavy vegetation. Also, the shaker assembly is directly attached to the frame which can cause substantial vibration of the frame during operation of the picker.

Christie et al. U.S. Pat. Nos. 3,325,984 and 3,385,042 disclose a straddle-type picker having a pair of freely rotatable drums which support a plurality of projecting bush contacting and penetrating fingers. Each of the drums is freely rotatable and moves along the row of bushes at the same rate that the frame of the machine passes over the ground. Each of the shakers has its own vibrating unit which rotates an eccentric connected to the central shaft of the drum. Both the frequency and amplitude of the motion of the shakers is manually adjustable by changing the position of mechanical linkages. Again, as in the previously described picker, the picking action can be erratic, depending upon the density of the vegetation in the bush. Also, drum-type pickers have a tendency to roll along the surface of the bush combing the branches stripping all of the berries and scraping the branches, damaging the plants.

Weygandt et al. U.S. Pat. No. 3,494,117 discloses a straddle-type picker having a pair of spaced drums supporting a plurality of fingers for contacting and dislodging the fruit from the bushes. Counter rotating weights, which rotate in a vertical plane, inside each drum cause the drums to move up and down and twist in opposite directions causing plant contacting tines on the outside of the drum to orbit in a vertical plane. The drums are large and heavy, requiring the use of heavy springs or spring arms to support the load. In view of the size of the drums, necessitated by having the weights rotate inside the drum, the picking fingers have to be shortened resulting in a picker which merely combs the surface of each bush. The pickers also had to be pivotally mounted so they could move away from a bush before the bush was crushed or seriously injured.

In each of the aforementioned references, the entire shaker assemblies can be made to move laterally relative to the plants being harvested. In Rust, the shakers are manually movable while in Christie et al., the shakers are spring biased to extend toward the longitudinal centerline of the machine. In Weygandt et al. the shaker are mounted on powered movable arms. In each of the referenced systems, the shaker or picker has a tendency to comb the outer surface of each bush.

It is extremely important in harvesting blueberries that the proper amount of energy be applied to each bush so that only the ripened fruit is collected, leaving the green or not yet fully ripened fruit for picking at another time. It is also important that the bushes be protected from damage during the harvesting process. In the past, the rows of blueberry bushes being harvested were slapped by flailing arms or radically oscillating shaker drums which produced a complex series of motions in the hope of striking all of the berry bearing branches to pick the fruit. The erratic oscillations of the pickers caused not only unripe berries to be picked but also the bushes themselves to be damaged.

SUMMARY OF THE INVENTION

In accordance with the present invention, a straddle-type blueberry harvesting machine is disclosed which employs a pair of spaced shakers, each of which has its own independent source of vibratory energy. The amount of energy applied to each of the shakers can be precisely controlled and is not dependent on or affected by the load placed upon the shaker. Regardless of the load placed upon each shaker, the same amount of energy is applied to each unit. As a shaker breaks free of heavy vegetation, it does not tend to race. It merely returns to its normal picking mode.

Each of the shakers is freely rotatable and will roll along a row of bushes at the same rate as the ground is traversed by the supporting frame. The fingers on the shakers are constrained to undergo a controlled motion which is the sum of the vertical and horizontal forces applied which limits the tendency for branches to wrap about the fingers. Each of the shakers of the present invention, depend from a separate pivotally mounted subframe which is supported by the main frame of the harvesting machine. The subframes are mounted above the longitudinal passage through which the bushes pass as the harvester straddles a row of bushes. The lateral position of the shakers is fixed. Each shaker has a plurality of spaced elongated picking fingers which penetrate deeply into each bush as the shakers freely rotate. The picked fruit falls onto a plurality of movable catcher pans which form a substantially continuous floor under each bush as it moves through the machine, the catcher pans being movable by the bush.

A large volume of air is supplied under the catcher pans to deflect fruit which might fall through the opening. The picked fruit moves from the catcher pans onto a conveyor belt on each side of the machine. The conveyor belts have apertures therein and some of the air which blows under the catcher pans is directed through the apertures to clean the picked fruit. A secondary air supply on each side of the frame provides additional air to thoroughly clean the fruit to prepare it for washing and packaging without the need for additional cleaning.

DETAILED DESCRIPTION OF THE DRAWINGS

DETAILED DESCRIPTION OF THE PREFERRED EMBODIMENTS

Figure 1:
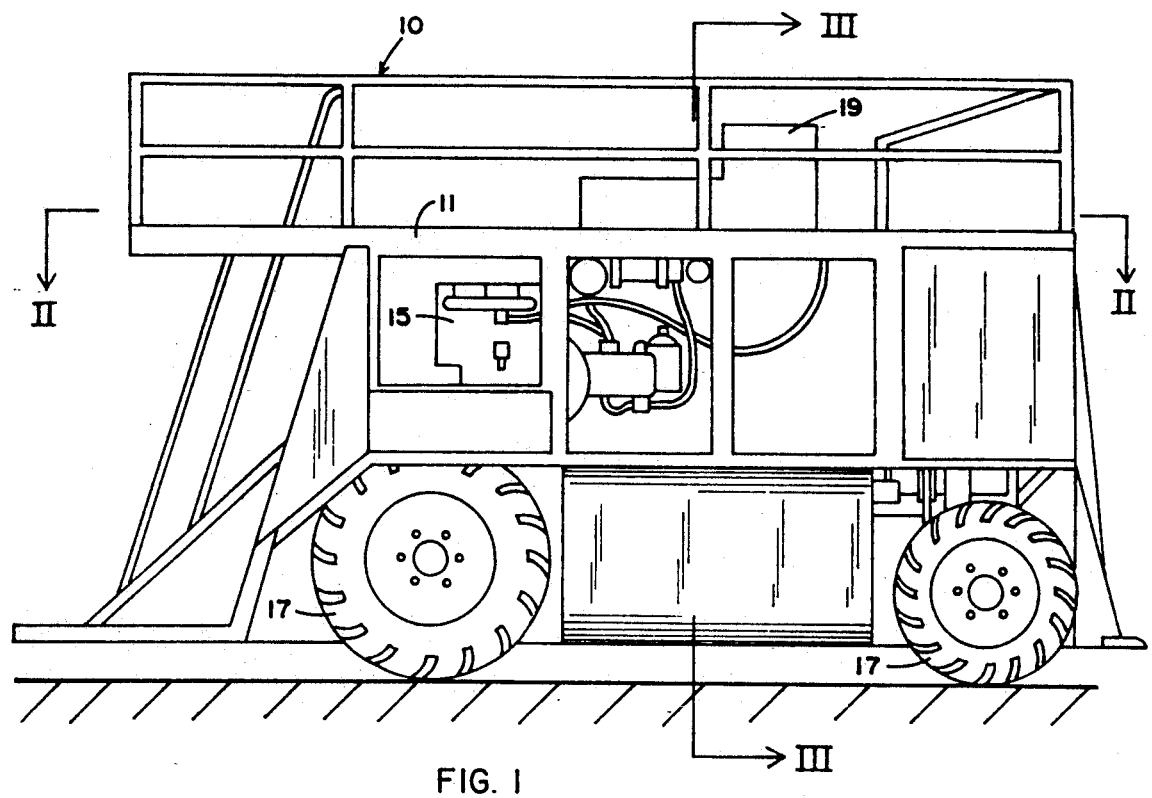
FIG. 1 is a side elevational view of the blueberry harvesting machine.
Figure 2:
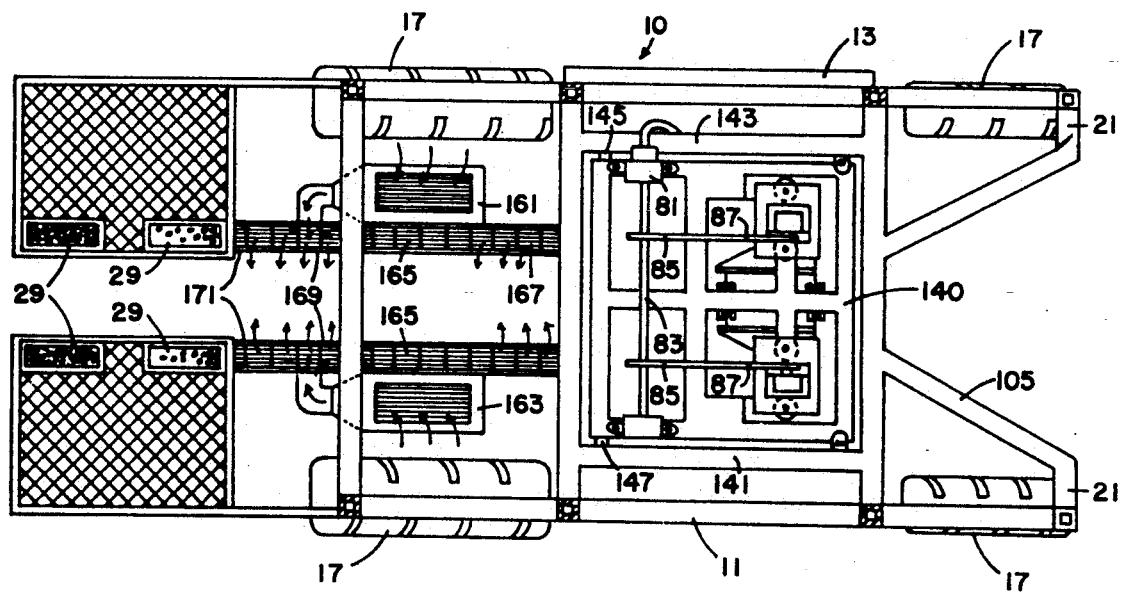
FIG. 2 is a top plan view along the line II—II of FIG. 1, with the shaker assemblies removed so that the cleaning air blowers and conveyor belts can be seen.

Referring to FIGS. 1 and 2, the harvesting machine of the present invention is indicated generally by the number 10. The harvesting machine has an inverted U-shaped frame configuration having a left side 11 and a right side 13. The harvesting machine is a self-propelled motor vehicle having an engine 15 (FIG. 1) and four ground contacting wheels 17. The harvesting machine is controlled from a raised position 19 from which the operator can view the row of bushes and the individual bushes as they enter the machine. The inner and outer surfaces of the machine are covered with a smooth material, preferably sheet metal, to enable the machine to pass over a row of bushes being harvested and along adjacent rows without damaging the bushes. The leading edge portion 21 of each side of the machine is covered during operation to protect adjacent bushes and also to help direct extending branches of the bushes being harvested into the center portion of the machine.

Figure 3:
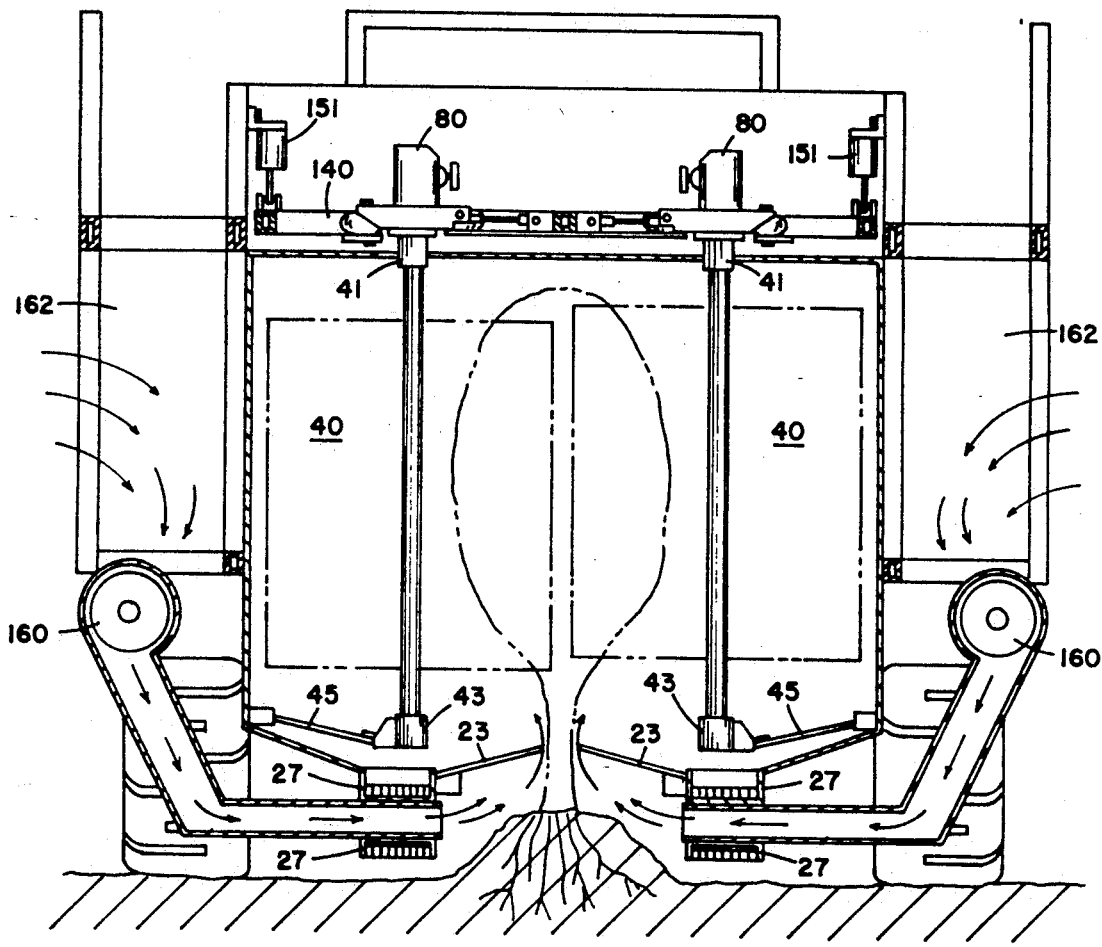
FIG. 3 is a sectional view of the blueberry harvesting machine taken on the line III—III of FIG. 1, showing the location of the shaker assemblies, the blowers used in harvesting the blueberries, the catcher pans and the endless conveyor belts used to deliver harvested berries to containers at the rear of the machine.

As shown in FIG. 3, the bottom portion of the center of the harvesting machine is substantially closed by a plurality of pivotally mounted catcher pans 23. The catcher pans are supported by the frame of the harvesting machine at an inclined angle so that any fruit or berries falling on a pan will tend to roll downwardly and outwardly to the conveyor belts 27 where the fruit is transported to the rear of the machine where it is dropped into containers 29 (FIG. 2) supported on the shelf 31 which projects from each side of the rear of the harvesting machine.

Figure 7:
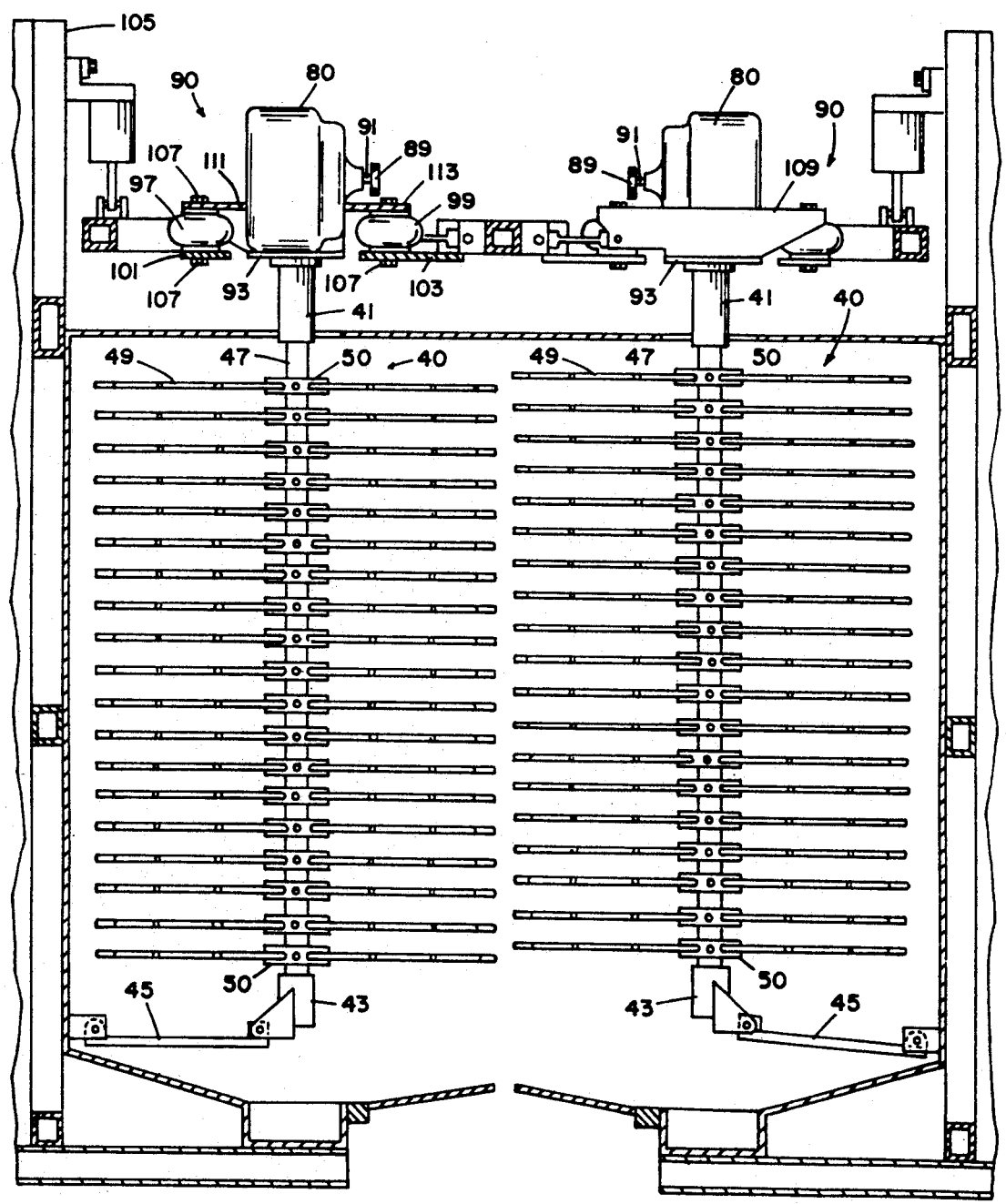
FIG. 7 is a fragmentary view showing the resilient supports for each shaker and associated driver on an embodiment of the harvesting machine employing a movable subframe.

In FIGS. 3 and 7, a pair of shakers, indicated by the number 40, are shown mounted on each side of the longitudinal centerline of the harvesting machine. Each shaker is supported in a collar 41. The bottom of each shaker has a collar 43 which is pivotally attached by struts 45 to the frame of the harvesting machine. This mounting at the top and bottom of each shaker 40 helps to control the motion of the shaker.

Shaft 47 of each shaker assembly has a plurality of substantially rigid fingers or rods 49 projecting outwardly in a circular pattern about the central shaft. Rods 49 are supported y spaced hubs 50 attached to shaft 47 Hubs 50 can be attached to shaft 47 by any type of conventional fastener or by welding. Welding is preferred due to its simplicity and durability. Each shaker has an overall diameter of approximately 41 inches and is approximately 5 feet long with 18-20 sets of fingers spaced in tiers approximately three inches apart along the length of each shaft 47. Each shaker assembly is substantially lighter than the drum-type shakers previously used.

The shaker assemblies 40 (FIG. 7) are mounted in supports 41 and 43 so that the units can freely rotate as the row straddling harvesting machine passes over a row of blueberry bushes and the bushes pass between the shaker elements.

Figure 6:
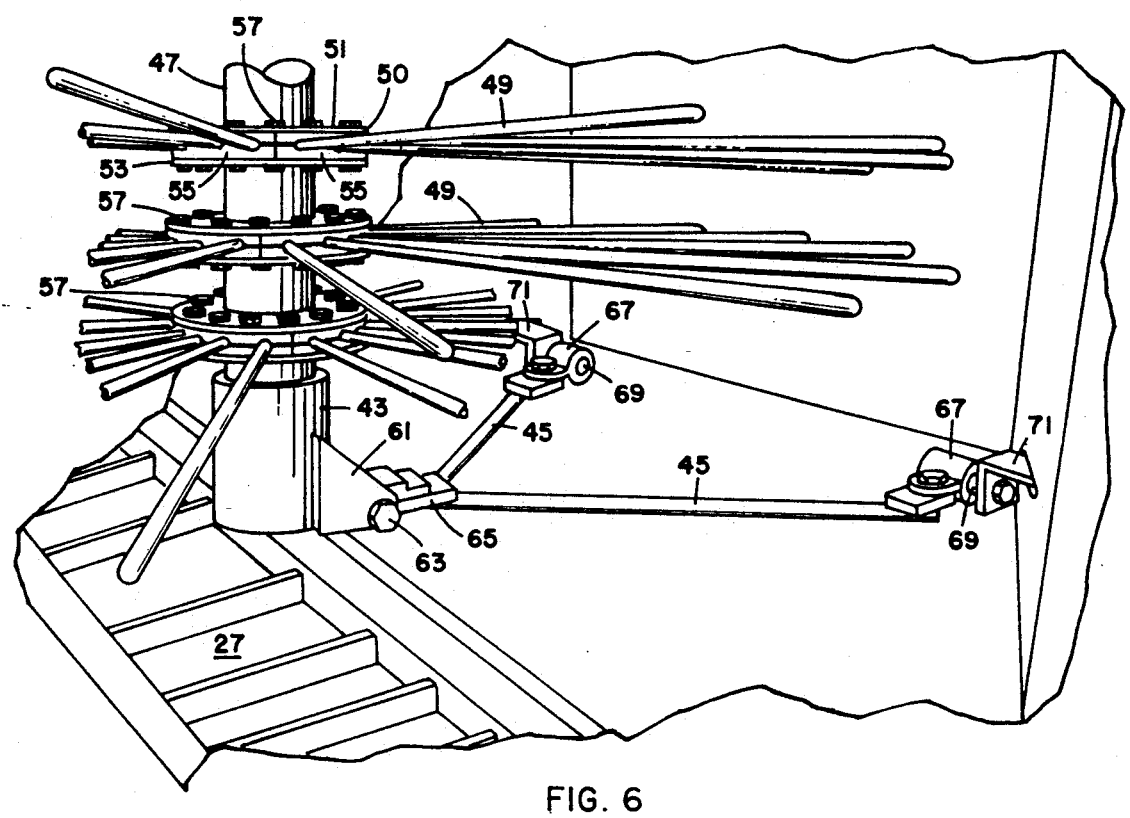
FIG. 6 is a fragmented view of the bottom end of a shaker assembly showing the struts used to hold the shaker assembly in position.

Referring to FIG. 6, the bottom portion of a shaker assembly 40 is shown. The collars 50, which support picking fingers 49, are made up of an upper collar 51 and a lower collar 53, each of which is preferably welded to center shaft 47. Between each of the upper and lower collars are mounted four sectors 55, each of which contain radially spaced grooves. When the sectors are stacked between the collars, the grooves align to provide a plurality of radially spaced sockets for receiving the ends of the rods 49. The collars 51 and 53 can be tightened by spaced nut and bolt fasteners 57 to compress the sectors onto the rods 49 to tightly hold the rods in place. The number of rods used in each tier and the alignment of rods in adjacent tiers can be changed as needed for a particular crop or for particular harvest conditions. Also, by using proper spacing of the rods on each picker, the rods can be made to overlap. This is particularly helpful in harvesting the top of a bush.

Each of the rods 49 is preferably made of fiberglass and is approximately twenty inches long and approximately one-half inch in diameter. In order to protect the bushes and berries from damage, the free end of each rod is slightly rounded to enable the rod to penetrate deeply into a bush without damage.

In order to control and constrain the bottom of shaft 47, a sleeve 43 is mounted on the bottom of the shaft. Sleeve 43 contains a bearing assembly (not shown) to enable the shaker unit to freely rotate. A pair of spaced flanges 61, only one of which is shown, are welded to sleeve 43. A bolt and nut combination 63 provide a pivot point for a link 65 which is fastened to a pair of diverging struts 45. The remote ends of struts 45 are attached to pivotable links 67. The pivotable links are fastened to pivot pins 69. The pins 69 are attached to flanges 71 which are fastened to the frame of the harvesting machine. Sleeve 43 is free to move up and down in a vertical direction while erratic movements are prevented by pivotally mounted struts 45.

In the first and second embodiments of the present invention, each shaker 40 has a driver unit 80 which causes the shaker assembly to reciprocate vertically. Each driver unit 80 is an Ajax vibrating shaker drive which is manufactured by Renold Inc., Westfield, N.Y. Each driver unit contains a pair of counter-rotating weights. Driver units utilize the forces set up by rotating two weights in opposite directions. The two weights are mounted on shafts geared together and supported by anti-friction bearings in a totally enclosed housing. The centrifugal forces of the counter rotating weights combine at two points to produce a directional force. These points are where the weights are passing on the axis which is vertical (or perpendicular) to the foot mounting pad. When the driver is attached to a freely supported member, the forces generated will produce an amplitude of vibration at the running frequency. The weights in the driver unit are rotating in phase but in opposite directions so that the force applied when the weights pass at the top and bottom is delivered to the end of shaker assembly 40 in the form of a reciprocating motion.

An hydraulic motor 81 (FIG. 2) drives a shaft 83 upon which a pair of spaced pulleys 85 are mounted. Rubber drive belts 87 extend from each pulley 85 to a pulley 89 (FIG. 7) fixed to the drive shaft 91 of each driver unit 80. The rubber belts used can be simple V-belts with appropriately shaped pulleys or rubber timing belts having spaced teeth in cooperation with cogged pulleys. The operator of the harvesting machine can control the speed of hydraulic motor 81 and in turn the speed of rotation of driver units 80. The two driver units 80 can be operated either in phase with each other or out of phase with one shaker assembly 40 ascending while the adjacent shaker unit is descending.

Drive unit 80 is supported directly above each shaker unit 40 on a driver unit support platform 90. The drive unit 80 is on a platform 93 to which it is bolted by spaced bolts 95, referring to FIGS. 5 and 7. A pair of air bags 97 and 99 are supported on steel plates 101 and 103 which are welded to frame 105. Bolts 107 are used to hold the air bags in place on their respective supports. A side frame member 109 (FIG. 7) is connected between plate 93 and two plates 111 and 113. Plates 111 and 113 extend across the drive unit 80 to a second plate 109 (not shown) which is joined to the opposite end of plate 93. For clarity in FIG. 7, plate 109 is not shown on the left platform so that the air bags and their mountings can be seen. Air bag 97 is positioned between support plate 101 and cross plate 111 and is held in position by bolts 107. Air bag 99 is supported on plate 103 and is held in below cross plate 113 by bolts 107. Air bags 97 and 99 are connected to a source of high pressure air so that the operator of the harvesting machine can inflate the bags to adjust the position of the shaker assemblies.

Figure 5:
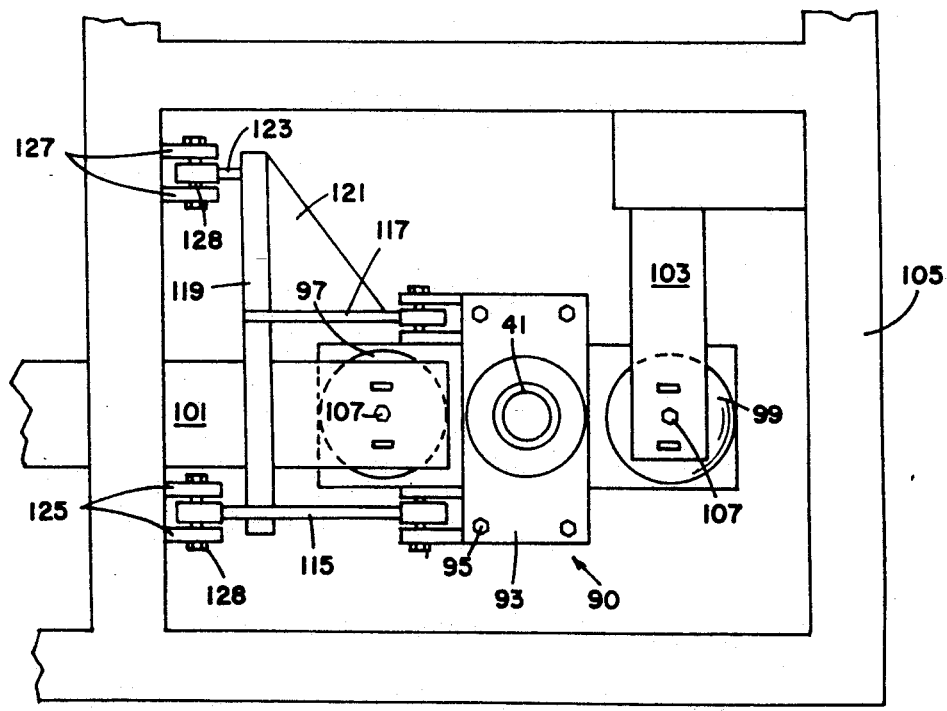
FIG. 5 is an overhead view of the components used to resiliently attach a shaker assembly to a fixed frame.

As discussed above, driver units 80 employ a pair of counter-rotating weights (not shown) which cause shaker assembly 40 to undergo vertical reciprocating motion. In order to preclude a twisting action being imposed on the shakers as the weights move outwardly in opposite directions, a pair of struts 115 and 117 are connected to the driver unit support platform 90 in the first embodiment of the present invention, as shown in FIG. 5. Struts 115 and 117 are fastened together by a brace 119 which spaces the attachment points of the two struts to frame 105. Struts 115 and 117 are preferably welded to brace 119 which is a length of two inch diameter steel tubing. A gusset plate 121 is fastened between strut 117 and brace 119 to resist the tendency for the shaker units 40 to be pushed backward as the harvesting machine advances over a row of bushes. The gusset plate could also be attached to strut 115 to provide a pulling force to resist movement of the shaker assembly. Likewise, two gusset plates can be used, if necessary, depending on the type of plants being harvested.

Strut 115 and attachment member 123 are each pivotally attached by fasteners 128, such as a combination of a bolt and nut, to a pair of spaced flanges 125 and 127 which are attached to fame 105. In order to reduce the amount of vibration transmitted to the frame, the end of strut 115 and attachment member 123 contain rubber blocks (not shown) through which fasteners 128 can pass. The second shaker assembly 40 is attached to frame 105 in substantially the same way using the mirror image of the connections.

In the first embodiment, driver units 80 and associated shaker assemblies are resiliently mounted directly on frame 105 of the harvesting machine. The operator of the machine can directly control the speed of rotation of the driver units and in turn the output power to move the shaker assemblies up and down sufficiently to harvest the blueberries.

In the second embodiment of the harvesting machine, the driver units and shaker assemblies are similarly attached to a subframe which is pivotally mounted in the center of the harvesting machine.

In a third and preferred embodiment of the harvesting machine yet to be described, each driver unit and picker assembly depends from a pivotally mounted subframe.

The subframe in the second embodiment can be moved up and down by the machine operator to extend the area covered by the shaker assembly. Again, the operator can control the energy applied to the shaker assemblies and can, for example, use a very small amount of energy and gently move the shaker through an extended range. The operator can also apply a large amount of energy to the shaker assemblies and only move the subframe as the operator determines, depending on the particular harvesting conditions encountered.

Figure 4:
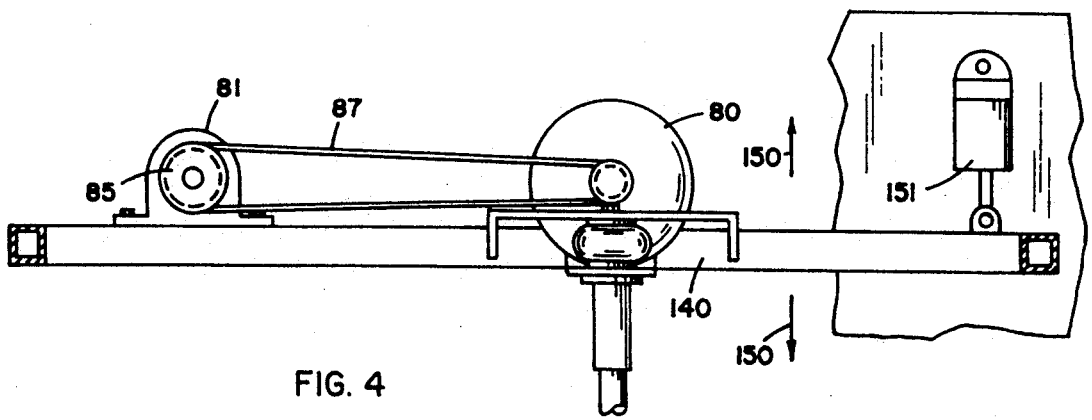
FIG. 4 is an elevational schematic view showing the subframe used to support the shaker assemblies on the main frame.

Now referring to FIGS. 2 and 4, subframe 140, shaker assemblies 40 and driver units 80 can be seen mounted above the center portion of the harvesting machine. The frame of the harvesting machine is indicated generally by the number 105. Subframe 140 is pivotally mounted to longitudinal frame members 141 and 143 by a pair of pivot pins 145 and 147. As can best be seen in FIG. 4, subframe 140 can be moved upwardly and downwardly, as shown by arrow 150, by double acting hydraulic cylinders 151.

The frequency of the vibration of shaker units 40 can be determined by controlling the speed at which the motor 81 causes the counter weight driver units 80 to rotate. The driver units can cause the shaker assemblies to move up and down from approximately one to one and one-half inches, with the preferred range approximately three-quarters of an inch to one inch. Subframe 140, can raise approximately three inches so that the combination of the vibration and the movement of subframe 140 will enable picker fingers 49 to move gently as a unit up and down and from branch to branch of a bush to harvest the ripe berries. The driver of the harvesting machine can control the speed of movement of the machine across the ground, the frequency of the vibration applied to shaker assemblies 40, and the amplitude of the movement of subframe 140 relative to main frame 105. The driver can also adjust the overall height of frame 105 using conventional hydraulic cylinders (not shown). The driver, after a preliminary adjustment of the height of the frame, can then make a fine adjustment of the height of shaker assemblies 40 and fingers 49 by adjusting the air pressure applied to air bags 97 and 99 supporting the shaker units.

As best seen in FIG. 3, a blower assembly 160 is mounted in each side of the harvesting machine and directs its output air below catcher pans 23. The use of an air blower in the harvesting of blueberries is disclosed in U.S. patent application Ser. No. 07/605,580 filed Oct. 30, 1990, entitled BLUEBERRY HARVESTING MACHINE now U.S. Pat. No. 5,074,107, issued Dec. 24, 1991. The patent application was filed in the name of Donald Windemuller, a co-inventor of the present invention. In the preferred embodiment, the air is directed through the center of endless conveyor belt 27 in order to raise the bottom of the harvesting machine. The air can also be directed below the conveyor belt; however, this lowers the bottom of the machine and raises the possible incidence of ground contact and possible root damage to the bushes being harvested. The input air for the blower 160 is preferably brought into the sides of the machine through screened openings 162. Each blower assembly 160 is approximately four feet in length and sixteen inches in diameter and has a plurality of spaced, slightly concave, air moving veins for moving the air. The fans are preferably of the cross-throw type similar to fans used in wheat harvesting combines. While the cross-throw fan is preferred, the invention is not so limited. Other types of fans such as centrifugal and separate blades mounted on a hub can be used. Also, the fans can either push or pull the air.

Each fan 160 is preferably driven by a conventional hydraulic motor attached directly to the rotor. The fans can also be indirectly driven using rubber drive belts connected to remotely positioned hydraulic motors. By using direct drive for each blower on the harvesting machine, several sources of potential mechanical failure are eliminated, increasing the reliability of the blower assemblies.

In the third embodiment of the present invention, referring to FIGS. 8-13, each driver unit 200 and each picker assembly 40 depend from individual pivotally mounted subframes 203 and 205 which are attached to main frame 105 of the harvesting machine.

It is also within the scope of the present invention to support the drive units 80 and picker assemblies 40 of the second embodiment of the invention on separate subframes rather than on a single subframe, as shown in FIGS. 3 and 7.

The previously described drive units used in the first and second embodiments of the present invention were unmodified Ajax units, as received from Renold, Inc. of Westfield, N.Y. In the third embodiment of the present invention, the drive units are modified to increase the spacing between the rotating weights and to provide for a vertical drive rather than the previously discussed horizontal drive.

Figure 9:
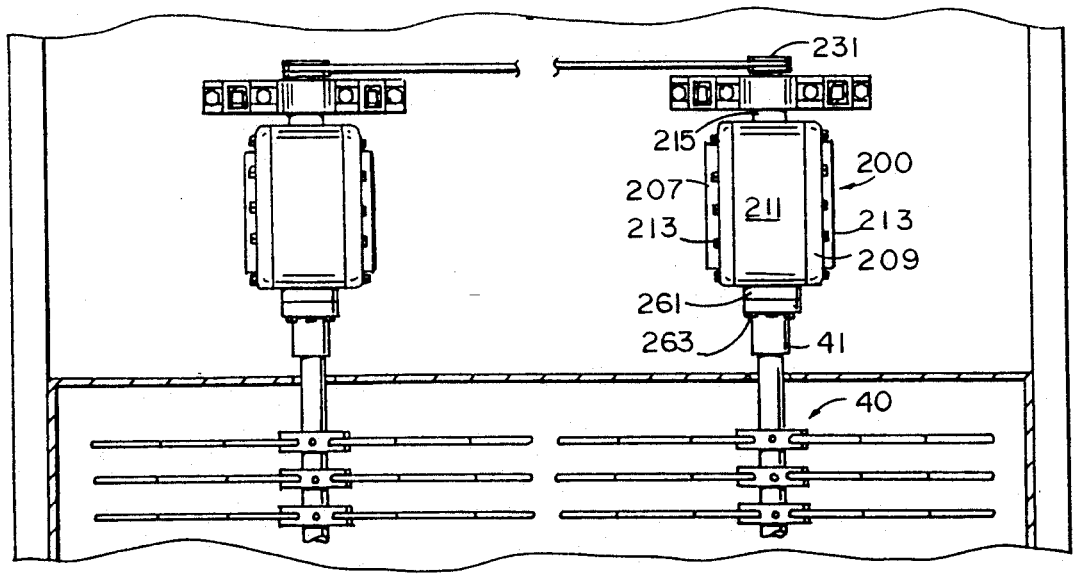
FIG. 9 is a partial elevational view showing a drive unit and shaker of the third embodiment of the invention.
Figure 10:
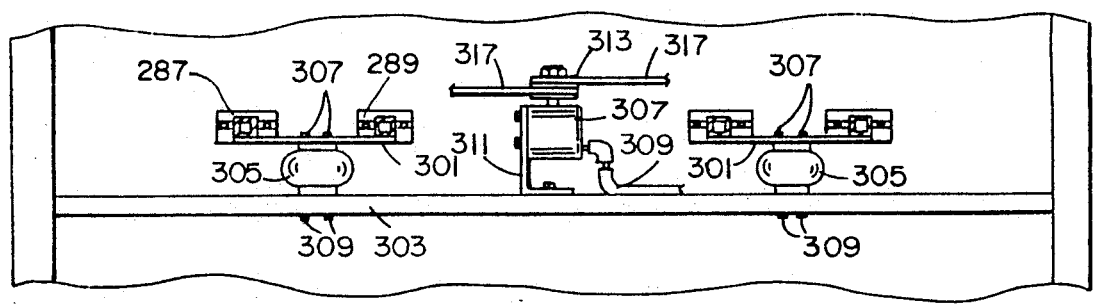
FIG. 10 is a fragmentary view, partially in section of the resilient support and motor used to power the picking assemblies.
Figure 11:
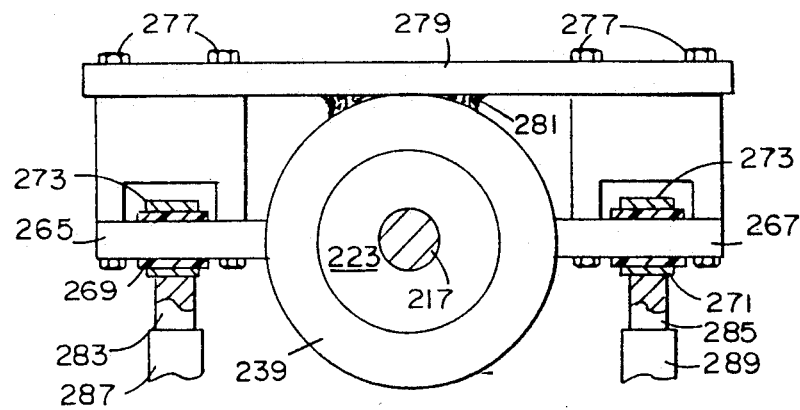
FIG. 11 is a top plan view showing the attachment of a bearing collar for the drive assembly to the supporting subframe.

Referring to FIG. 9, the end bells 207 and 209 of the drive unit are separated by a center housing member 211. The three parts can be fastened together with suitable bolts 213.

Figure 12:
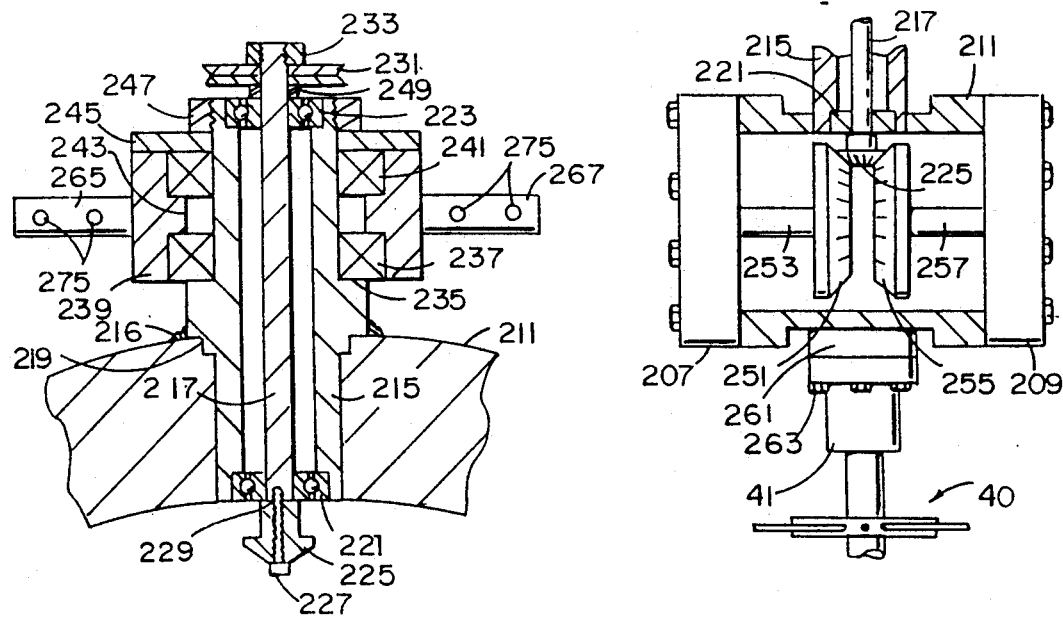
FIG. 12 is a partial sectional view of the support and bearing assembly for the drive and picker assembly.
Figure 13:
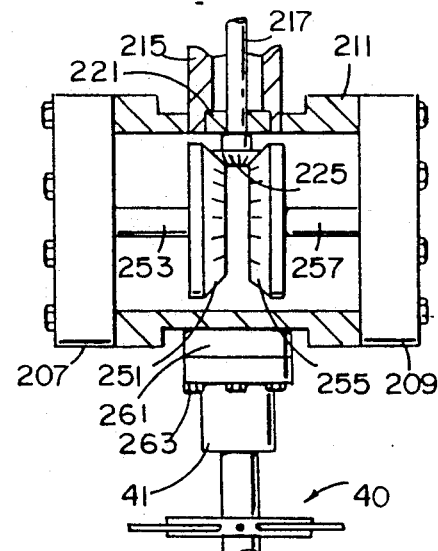
FIG. 13 is a partial sectional view of a bearing and drive assembly used in the third embodiment of the invention.

Center housing member 211 has a support member 215 welded on the top at 216 through which a drive shaft 217 passes (FIGS. 12 and 13). Support member 215 fits within an aperture 219 in the top of housing 211 and depends downwardly into the housing. Each end of support member 215 is counterbored to receive and support bearing assemblies 221 and 223 for drive shaft 217. Bearing assemblies 221 and 223 are preferably angular contact bearings.

Drive shaft 217 extends through support member 215 and has a bevel gear 225 keyed to the lower end. The bevel gear is held by a locking bolt 227 which is threaded into a blind hole 229 in the end of shaft 217. A pulley 231 is keyed to the opposite end of shaft 217. This end of shaft 217 is threaded and has a locking nut assembly 233 holding the pulley in place.

Support member 215 has a circumferential shoulder 235 which supports a first bearing assembly 237. A bearing collar 239 covers bearing assembly 237 and supports a second bearing assembly 241 on an internal shoulder 243. Bearing collar 239 can be counterbored from each end to form the bearing cups for the bearing assemblies and to form the internal shoulder 243. Bearing assemblies 237 and 241 are preferably tapered roller bearing assemblies available from Timken Roller Bearing, Inc.

A locking washer 245 closes the top of bearing collar 239 and a locking nut 247 is threaded onto the threaded end of support member 215 to lock the bearing collar and bearing assemblies in place. A spacer 249 separates pulley 231 from locking nut 247.

Referring to FIG. 13, bevel gear 225 engages a bevel gear 251 mounted on an axle 253. Axle 253 supports an eccentric weight (not shown) which rotates within end bell 207. Bevel gear 225 also engages a second bevel gear 255 which is mounted on axle 257. Axle 257 supports the second eccentric weight (not shown) which rotates within end bell 209 Axles 253 and 257 separate the rotating eccentric weights. As bevel gear 225 rotates, bevel gears 251 and 255 also rotate but in opposite directions causing the eccentric weights in each end bell to rotate in opposite directions. The timing of the eccentric weights can be adjusted so that the weights pass at the top and bottom of each rotation and extend horizontally in opposite directions. It is preferred to use a 2:1 gear ratio between bevel gear 225 and bevel gears 251 and 255 to reduce the torque. The picker assemblies are mounted so that they can free wheel under the influence of the bushes being harvested. Due to the compound nature of the motion produced by the eccentric weights in each of drive units 80, picker assemblies 40 tend to rotate outwardly away from the center of the harvesting machine. The pressure of the straddled bushes tends to push picker assemblies 40 backward toward the machine. The shakers will rotate at the same speed as the harvesting machine traverses the ground. A collar 261 is welded to the bottom of center housing 211 in line with bearing collar 215. Collar 261 has a plurality of spaced threaded holes (not shown) for receiving bolts 263 for supporting collar 41 and picker assembly 40, which have previously been described.

Bearing collar 239 (FIG. 11) has a pair of oppositely positioned extending support shafts 265 and 267 which are welded to the outside of the collar. Each support shaft extends through a respective supporting member 269 and 271. Rubber cushions 273 in each support member help to reduce the amount of vibration induced in main frame 105. Each support shaft has a pair of spaced holes 275 on either side of the support member through which bolts 277 pass to fasten the shafts to a brace 279. Brace 279 is welded at 281 to bearing collar 215.

Figure 8:
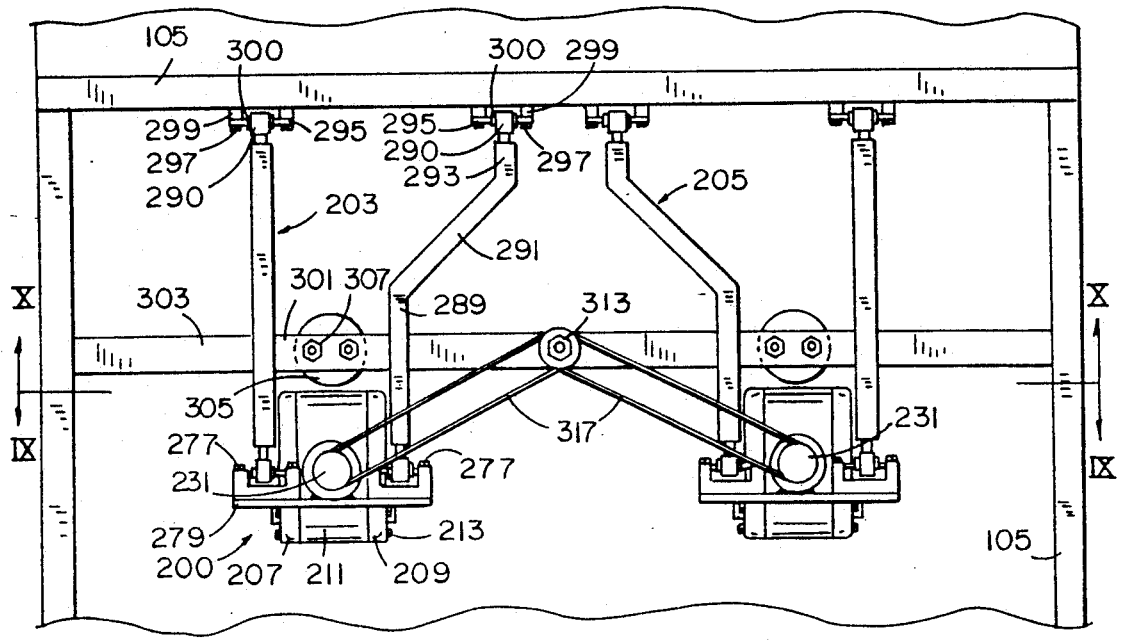
FIG. 8 is a partial top plan view of the third embodiment of the present invention.

Shafts 283 and 285 extend between support members 269 and 271 and legs 287 and 289, respectively. As best shown in FIG. 8, leg 287 extends straight back toward main frame 105 while leg 289 is fastened to an offset leg portion 291 which is, in turn, fastened to a straight leg portion 293 which is substantially parallel to leg portion 289. By using offset leg portion 293, the support points for subframe 203 are separated and the subframe is strengthened to reduce any tendency for the subframe to move left or right, as shown in FIG. 8, when the picker assembly is under load.

Legs 287 and 289 have substantially identical pivot support members 290 which are attached to pivot axles 295 which are bolted to frame 105 using bolts 297 and standoffs 299 to provide room for the pivot support members to move without encountering the frame. Rubber cushions 300 are used to isolate subframe 203 from main frame 105.

A cross brace 301 (FIG. 10) is fastened to the bottom of subframe legs 287 and 289, substantially in line with frame member 303 of main frame 105. An air bag 305 is bolted to brace 301 by spaced bolts 307. Substantially similar bolts 309 are used to fasten the bottom of air bag 305 to main frame member 303. Air bag 305 is connected to the high pressure air system on the harvesting machine (not shown) so that the driver can control the amount of inflation and, in turn, the initial picking height of picker assembly 40.

The second picking assembly is not shown in FIG. 8 since it is the mirror image of the complete assembly illustrated. Each driver unit 200 is driven by a hydraulic motor 307 (FIG. 10) which is connected to the hydraulic pump through a hose 309, the hydraulic connection being schematically illustrated for simplicity. Motor 307 is bolted to an L-shaped support 311 which is, in turn, fastened to cross frame member 303. A pair of pulleys 313 are mounted on the output shaft 315 of motor 307. Rubber belts 317 extend from pulleys 313 to each pulley 231 attached to drive shaft 217 of each driving unit 200.

It is preferred to use a belted chain rather than timing belts in order to preserve the timing or phase relationships between driving unit 200. A single belted chain is trained over the driving pulley on the motor and each pulley on the driving units. The pulleys used with the belted chains have substantially flat surfaces rather than the cogged surfaces or V-configuration used with rubber belts. In order to maintain the timing relationship between the drive units, the single belted chain is given two half twists as it is trained about the pulleys.

As previously discussed, the resulting forces produced tend to make picker assemblies 40 slowly turn outwardly away from the longitudinal access of the harvesting machine. The bushes being harvested reverse this direction of travel and cause the picking assemblies to turn as they free wheel inwardly with the bushes. It should be remembered that the belted chain and pulleys cause the eccentric weights in each driving unit to rotate. Any motion of the picking assemblies is the result of the rotation of the eccentric weights.

Through the use of the modified driving assembly of the third embodiment of the present invention, the picker assembly moves in a pattern which is the result of the sum of the applied forces. For simplicity of description, the picking assembly can be said to move up and down as well as twisting left and right horizontally. The amount of motion of the picking assembly can be determined by the machine operator who can control hydraulic motor 307 and, in turn, the rate of rotation of the eccentric weights in driver assemblies 200. The result is that the branches of the plants are not only gently shaken up and down, but at the same time are gently shaken left and right to dislodge the rip berries without over-picking each bush.

In the operation of the harvesting machine, the driver approaches a row of blueberry bushes to be harvested and makes the initial height adjustment of the frame and any fine tuning necessary with the pressure applied to the air bags. The driver then activates the shaker units and blowers 160 and advances the harvesting machine to straddle the row of blueberry bushes. As the blueberry bushes enter the harvesting machine, the driver from his position above the row, can look down to see the action of the shaker fingers on the bushes and determine whether the frequency of the vibration should be increased or decreased and whether subframe 140 should be raised or lowered, if the second embodiment of the harvesting machine is being used. As the shaker units dislodge the fruit, the fruit falls to the inclined floor formed by the pivotally mounted catcher pans and rolls to the side onto the conveyor belts. As the machine progresses, each blueberry bush opens an area of the catcher pans through which blueberries might fall and be lost on the ground. In order to prevent this loss, the fountain of air from blowers 160 flows upwardly through the opening in the catcher pans causing any blueberries which might tend to drop straight to the ground to be deflected to one side or the other of the harvesting machine. The asymmetric shape of the blueberry encourages this unstable flight. The combination of the motion of shaker assemblies 40 and the air blast from blowers 160 enables the harvesting machine to pick substantially all of the ripe berries from the blueberry bush without over-picking the bush, that is picking unripe berries or damaging the bush.

In FIG. 2, a pair of additional blowers 161 and 163 can be seen mounted on each side of the harvesting machine. Blowers 161 and 163 are similar to blower 160;

however, they are substantially smaller in size. Output ducts 162 and 164 direct the air into a duct (not shown) below conveyors 27.

As the blueberries fall on catcher pans 23 (FIG. 3) they roll off into conveyor belts 27 on each side of the machine. The conveyor belt is made up of spaced plastic compartments 165 which have a plurality of apertures in the bottom. The conveyor belts are available from Intralox, Inc., Harahan, La.

A portion of the air supplied by blower 160 is allowed to blow up through the bottom of the conveyor belt at location 167 (FIG. 2). This air provides an initial cleaning for the berries removing leaves, twigs and other debris that might have fallen on conveyors 27. The conveyor then proceeds to station 169 where air from blowers 161 and 163 provide a second cleaning of the berries. Prior to the position where the conveyor turns and dumps the fruit into boxes 29, a third cleaning station 171 is provided. The three separate cleaning stations thoroughly remove all foreign material from the berries enabling the berries to be washed and packaged or quick frozen without further cleaning and handling, substantially reducing the amount of labor involved in handling and cleaning the picked berries.

Though the invention has been described with respect to a specific preferred embodiment thereof, many variations and modifications will become apparent to those skilled in the art. It is therefore the intention that the appended claims be interpreted as broadly as possible in view of the prior art to include all such variations and modifications.

The embodiments of the invention in which an exclusive property or privilege is claimed are defined as follows.

1. A crop picking apparatus comprising:
   a bearing means for depending from a supporting frame;
   a picker driving means rotatably supported by said bearing means, said picker driving means including a pair of eccentric weights mounted to rotate in a vertical plane in synchronism but in opposite directions so that they pass at the top and bottom of each rotation;
   an elongated shaft depending substantially vertically from and rotatably driven by said picker driven means; and
   a plurality of picking fingers supported by said elongated shaft for rotation with.

2. A crop picking apparatus comprising:
   a supporting frame;
   an air bag for supporting said frame;
   a bearing means depending from each frame;
   a picker driving means rotatably supported by said bearing means;
   an elongated shaft depending from said picker driving means; and
   a plurality of picking fingers supported by said elongated shaft.

3. A straddle-type harvesting machine comprising:
   first frame means having a longitudinal opening therein for straddling a row of bushes to be harvested;
   a pair of spaced second frame means pivotally supported by said first frame means above the longitudinal opening therein;
   a resilient means on said first frame means for supporting each of said second frame means;
   a bearing means supported by each of said second frame means;
   a driving means depending from each of said bearing means into said longitudinal opening in said first frame means; and
   a picking means depending from each of said driving means, said picking means including an elongated depending shaft, and a plurality of longitudinally spaced tiers of picking fingers supported on and extending transversely from said depending shaft.

4. A straddle-type harvesting machine as set forth in claim 3, wherein said resilient means are air bags.

5. A straddle-type harvesting machine as set forth in claim 3, wherein each of said driving means and picking means is freely rotatably mounted to its supporting second frame means.

6. A straddle-type harvesting machine as set forth in claim 3, wherein each of said picking means is in a fixed lateral position relative to first frame means.

7. A straddle-type harvesting machine as set forth in claim 3, wherein each of said picking means comprises an elongated axle having a plurality of spaced hubs mounted thereon; and
   a plurality of elongated rods supported by each of said hubs.

8. A straddle-type harvesting machine as set forth in claim 3, wherein the ends of said rods on one of said picking means substantially contact the ends of said rods on the other picking means with the path of travel of some rods overlapping.

9. A straddle-type harvesting machine as set forth in claim 3, wherein said picking means substantially close said longitudinal opening in said frame, means.

10. A straddle-type harvesting machine as set forth in claim 3, wherein each of said drive means comprises a housing depending from each of said bearing means;
    each housing contains a pair of rotatable eccentric weights, said weights being mounted to rotate in a vertical plane and in synchronism but in opposite directions so that said weights pass at the top and bottom of each rotation.

11. A straddle-type harvesting machine as set forth in claim 3, wherein the frequency and amount of vibrating motion imparted to each of said picking means can be varied by changing the rate of rotation of said weights.

12. A straddle-type harvesting machine as set forth in claim 3, wherein said drive means can vibrate out of phase with each other so that one of said picking means can be ascending while the other of said picking means is descending.

13. A straddle-type harvesting machine as set forth in claim 3, further including:
    a plurality of catcher pans mounted on each side of said frame means, said catcher pans extending toward the center of said frame means and substantially closing the bottom of said frame means; and
    air supply means for supplying a large volume of air under said catcher pans and up and through said catcher pans as said catcher pans are moved by a bush being straddled by said harvesting machine.

14. A straddle-type harvesting machine as set forth in claim 3, further including:
    a continuous conveyor belt on each side of said frame for receiving fruit off said catcher pans and for transporting said fruit to the rear of said harvesting fruit receiving portion and a lower return portion; and said air supply means supplying said air for said catcher pans through the space between said upper and lower portions of said conveyor belts.

15. A straddle-type harvesting machine as set forth in claim 3, wherein each of said conveyor belts has a plurality of apertures therein and a portion of the air from said air supply means blows up through said apertures to clean debris from the picked fruit.

16. A straddle-type harvesting machine as set forth in claim 3, including a second air supply means for blowing air through said conveyor belt to remove any remaining debris from the picked fruit.

* * * * *